Aug. 27, 1963     R. A. HAYES     3,101,686
MACHINE FOR PRODUCING SAFETY STITCH
Filed Jan. 19, 1959                                       8 Sheets-Sheet 1

FIG. I

Aug. 27, 1963   R. A. HAYES   3,101,686
MACHINE FOR PRODUCING SAFETY STITCH
Filed Jan. 19, 1959   8 Sheets-Sheet 2

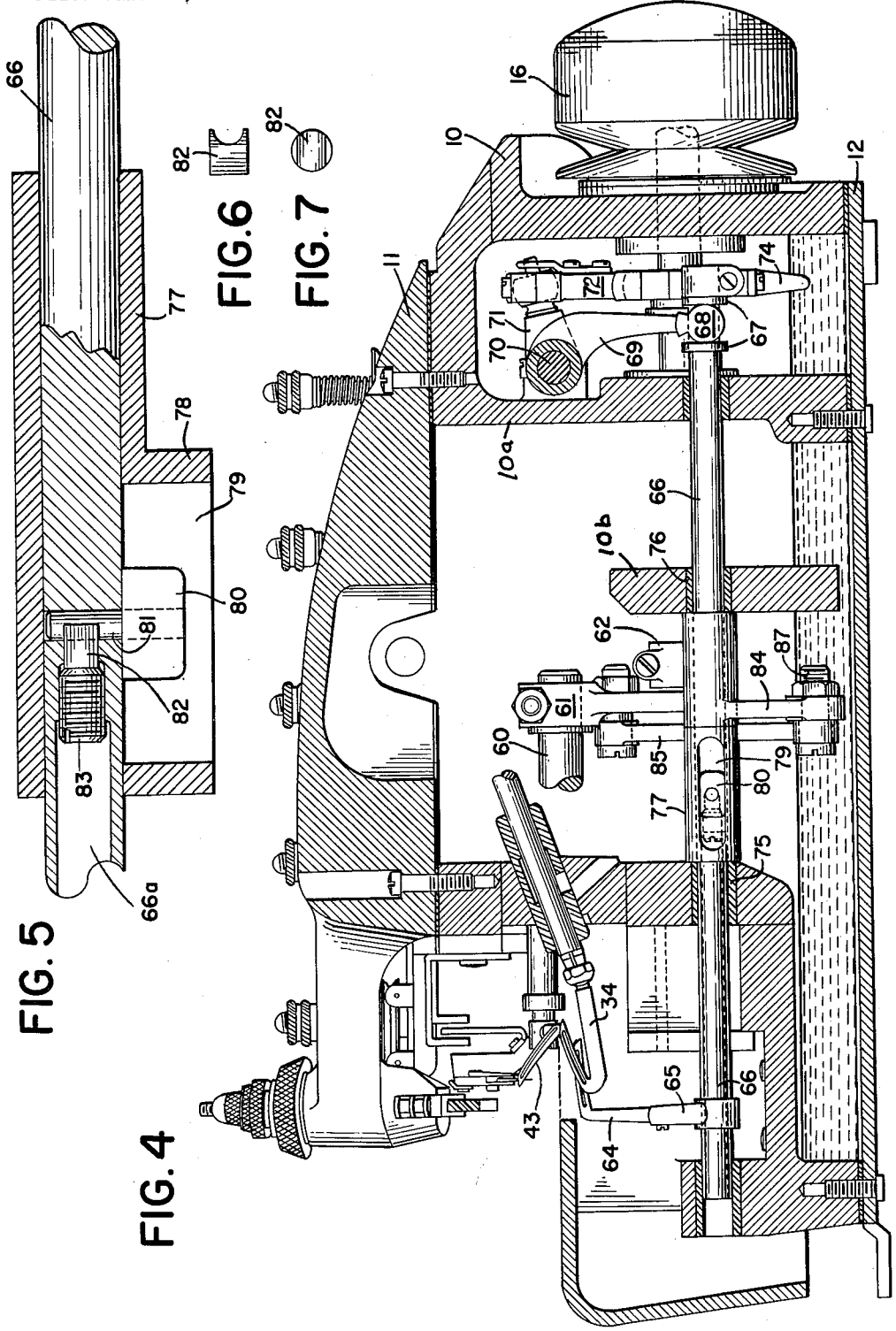

Aug. 27, 1963

R. A. HAYES 3,101,686

MACHINE FOR PRODUCING SAFETY STITCH

Filed Jan. 19, 1959

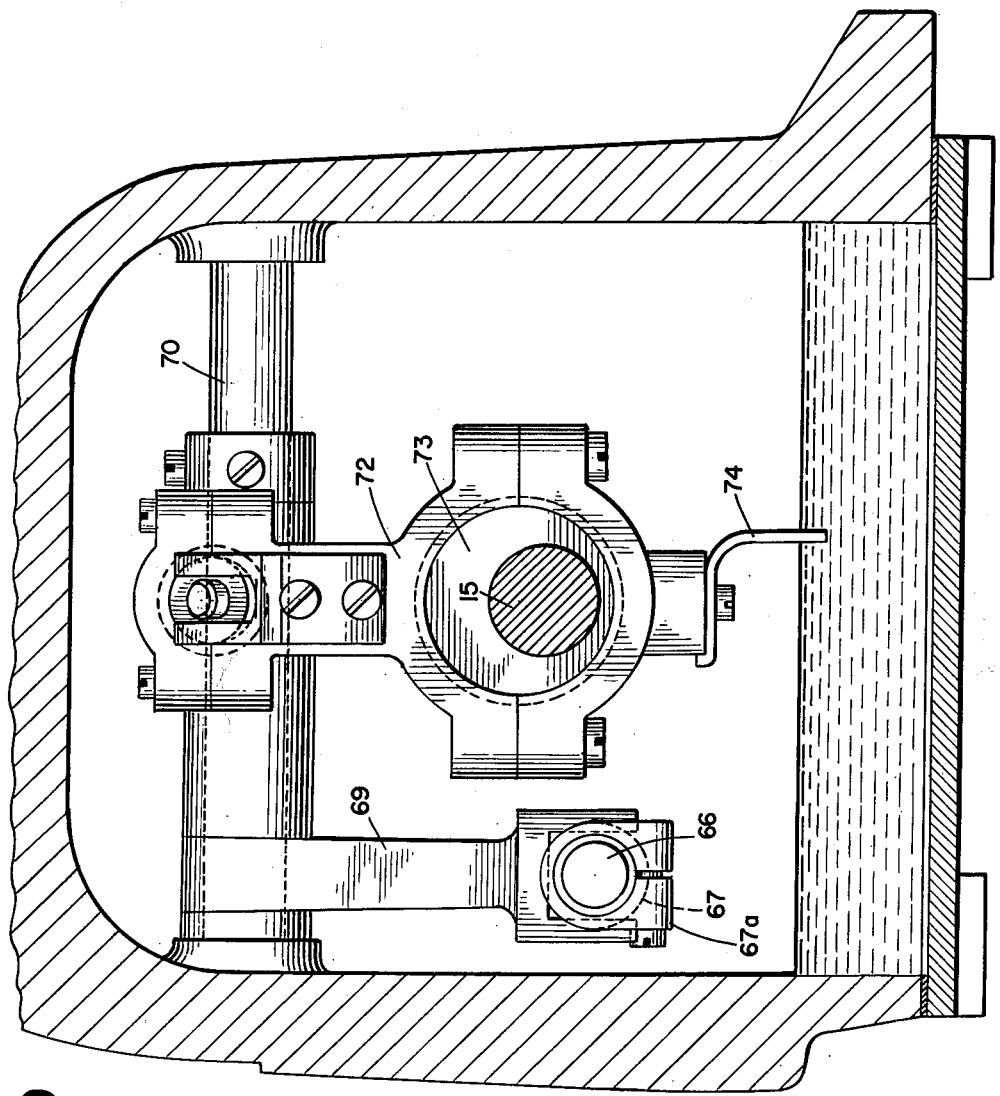
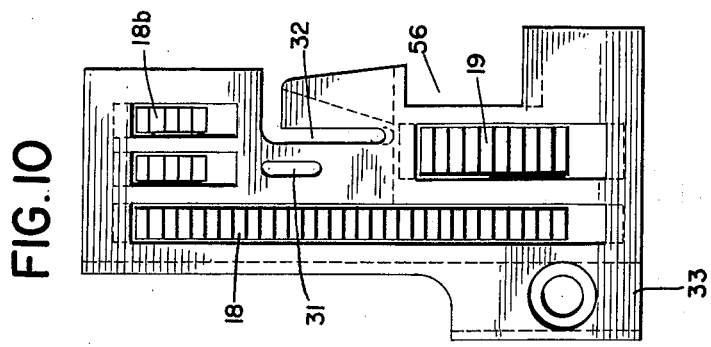

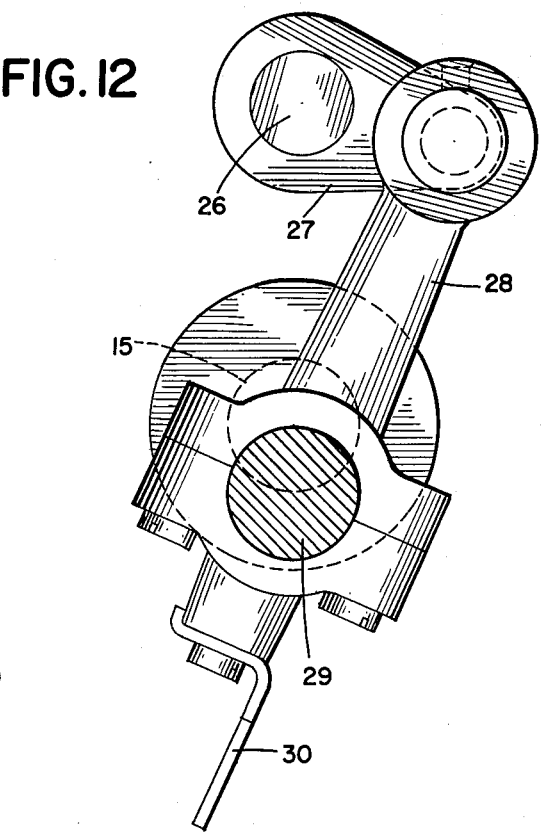
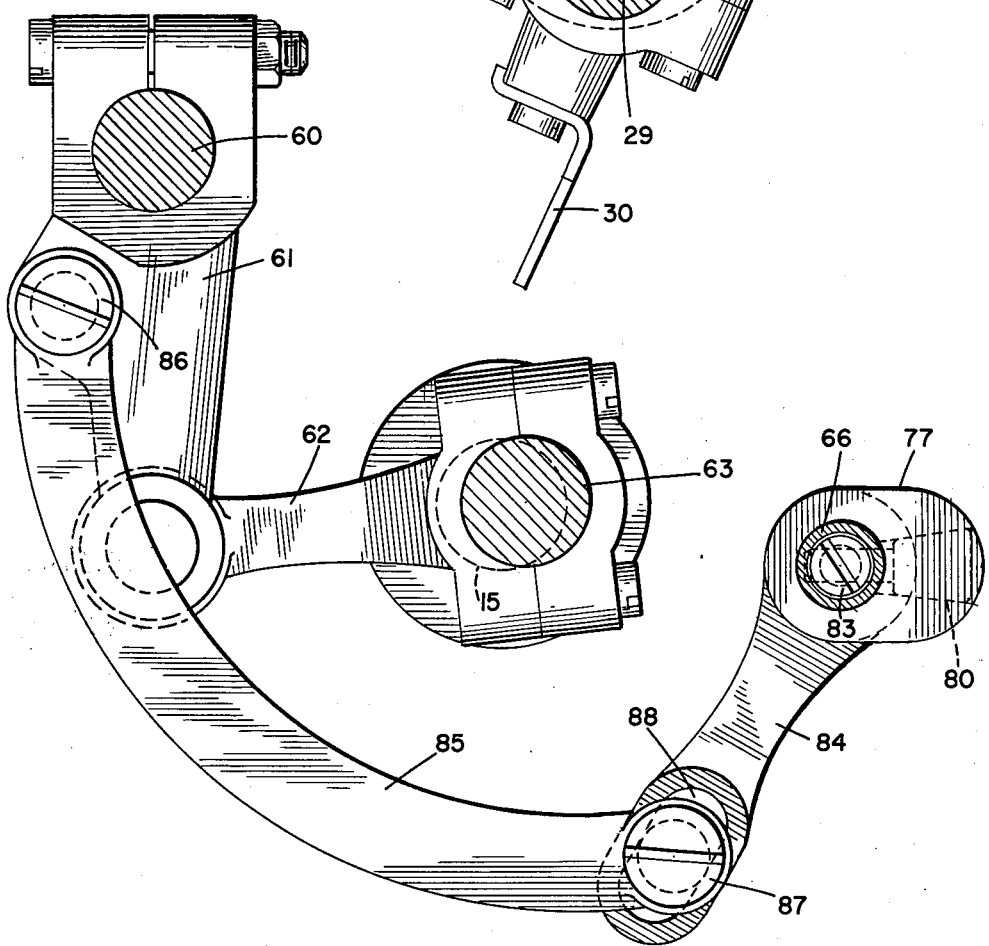

United States Patent Office 3,101,686
Patented Aug. 27, 1963

3,101,686
MACHINE FOR PRODUCING SAFETY STITCH
Robert A. Hayes, Franklin Park, Ill., assignor to Union Special Machine Company, Chicago, Ill., a corporation of Illinois
Filed Jan. 19, 1959, Ser. No. 787,424
12 Claims. (Cl. 112—162)

This invention relates to an improved machine for producing a so-called "safety stitch" which involves at least one line of through and through stitching spaced from the edge of two superposed layers of fabric and a line of overedge stitching extending over the edge of said layers of fabric.

An object of the invention has been to provide a simple and reliable mechanism for producing a seam of the character indicated in a machine adapted for high speed operation. Toward this end the invention has been applied to a modern machine of the character particularly constructed for the high speed production of an overedge line of stitching. To such a machine there has been added special mechanism for producing at least one line of through and through stitches spaced inwardly of the free edges of the superposed layers of fabric a desired distance.

A feature of the invention comprises the incorporation in a machine of the character indicated of means for providing a through and through line of two-thread chain stitches which involves a reciprocatory or oscillatory needle and a looper which is reciprocated across the line of feed for loop seizing and shedding purposes and is oscillated to a slight extent for needle avoid purposes. The looper mechanism and its operating means for this purpose is so positioned in an existing style of machine for producing overedge stitches as not to interfere with or require relocation of any of the parts of the latter.

Considering the machine as a whole there is provided a plurality of curved needles carried by an oscillatory arm and a plurality of reciprocatory looper carrying rods, one arranged to cooperate with one of the needles to produce a line of through and through stitches of the character mentioned and two arranged to cooperate with another of said needles to produce the overedge line of stitching. Several of the looper carrying rods mentioned are also oscillated about their axes to cooperate with the related needle to produce the desired lines of stitching. This arrangement is such that simple movements are imparted to each of the stitch forming elements and simple connections are provided from the main drive shaft for imparting the various necessary movements. As a result of the combination as a whole there is provided a mechanism for forming a safety stitch which is capable of very high speed operation. A minimum number of moving parts is required and these are subjected to very simple movements which may be imparted at high speeds.

A special feature of the invention is the provision of simple connections from other mechanism required in the machine, such as an edge trimming mechanism, for oscillating the looper rod which takes part in the formation of the through and through line of stitching to provide the needle avoid movements to the related looper. This results in a simplification of the operating connections and enables the incorporation of the entire mechanism in the frame structure of a machine originally capable of producing only an overedge line of stitching.

As a further feature of the invention, all of the mechanisms for operating the looper carrying rods are in an enclosed housing provided with means for insuring adequate lubrication of these mechanisms. To facilitate the incorporation of this feature, all of the operating mechanism for the several looper rods is located toward the right of the stitch forming zone of the machine.

There is also incorporated in the machine simple and readily accessible means for controlling the various threads supplied to the several needles and their cooperating loopers. This means comprises a pair of take up arms mounted on the needle carrying arm or member and so arranged in relation to fixed guides as to effect a take up action on all the threads, except that supplied to the looper which enters into the formation of the through and through line of stitching. A special cam member on the main drive shaft in the region of the needle carrying arm serves to impart the desired take up action to that looper thread.

Other objects, features and advantages of the invention will appear from the following detailed description of an illustrative embodiment of the same which will now be given in conjunction with the accompanying drawings, in which:

FIG. 4 is a longitudinal, vertical section through the machine taken along a plane forwardly of that along which FIG. 1 is taken;

FIG. 5 is an enlarged detail view, mainly in horizontal section, of a portion of the looper rod forming part of the through and through stitch forming mechanism;

FIG. 6 is a side view of a small block forming part of the mechanism shown in FIG. 5;

FIG. 7 is an end view of said block;

FIG. 9 is a vertical sectional view taken along the line 9—9 of FIG. 1;

FIG. 10 is a plan view of the throat plate and the feed dogs embodied in the machine;

FIG. 11 is an enlarged sectional view taken transversely through the machine and illustrates the trimmer operating mechanism and connections for imparting needle avoid movements to the four-motion looper;

FIG. 12 is an enlarged sectional view taken transversely through the machine and shows the driving connections for rocking the needle carrying member.

Figure 1:
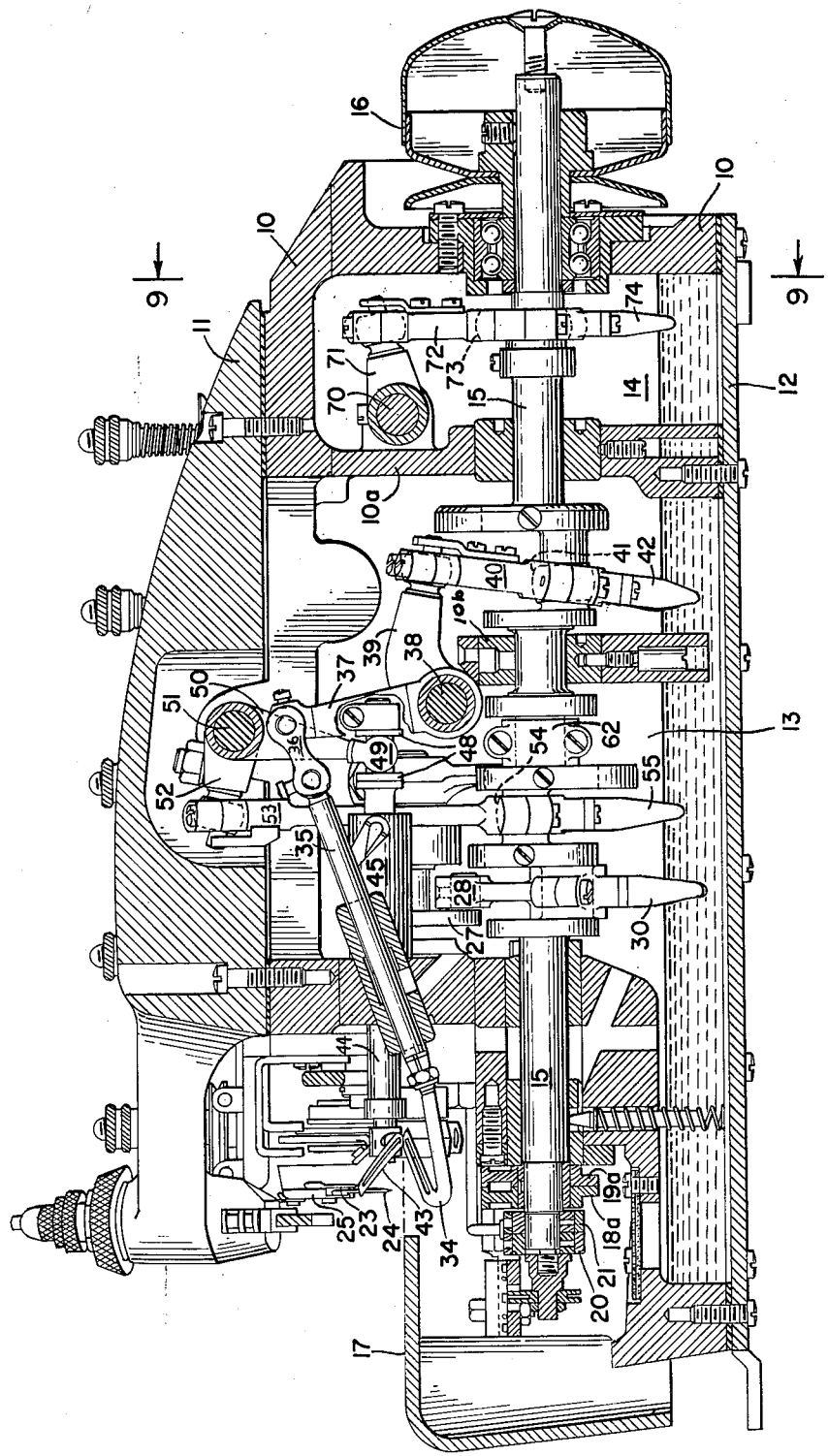
FIG. 1 is a longitudinal, vertical section through a machine embodying the invention.

Referring now to the drawings, the invention has been illustrated as applied to a high speed overedge stitching machine of the character disclosed in the Wallenberg et al. U.S. Patent No. 2,704,042, granted March 15, 1955. Reference may be had to said patent for a disclosure of certain details of the machine which are not shown herein.

The machine comprises a main frame 10 which is relatively low and serves to support all of the mechanism of the machine and to enclose most of the driving connections for the operated parts. A removable top closure member 11 is secured to the frame 10 by means of screws or the like, a gasket being provided between the frame and the cover member to form a lubricant-tight housing. To the bottom of the frame 10 there is similarly secured a bottom plate 12. The frame construction is such that two lubricant containing compartments 13 and 14 are provided, these preferably being in communication through suitable openings (not shown) in a wall 10a of the frame. Journaled in suitable bearings provided in the end walls of the enclosed housing and in the wall 10a and another intermediate wall 10b is a main drive shaft 15 which extends outwardly through the right end wall and has secured thereto, outside of the enclosed housing, a combined handwheel and pulley 16 by means of which power may be supplied to the machine. Shaft 15 extends outwardly through the left end wall of the enclosed housing and beneath a work supporting member 17 which is pivotally mounted on the main frame for outward swinging movement to provide access to the parts beneath the work supporting surface.

Figure 2:
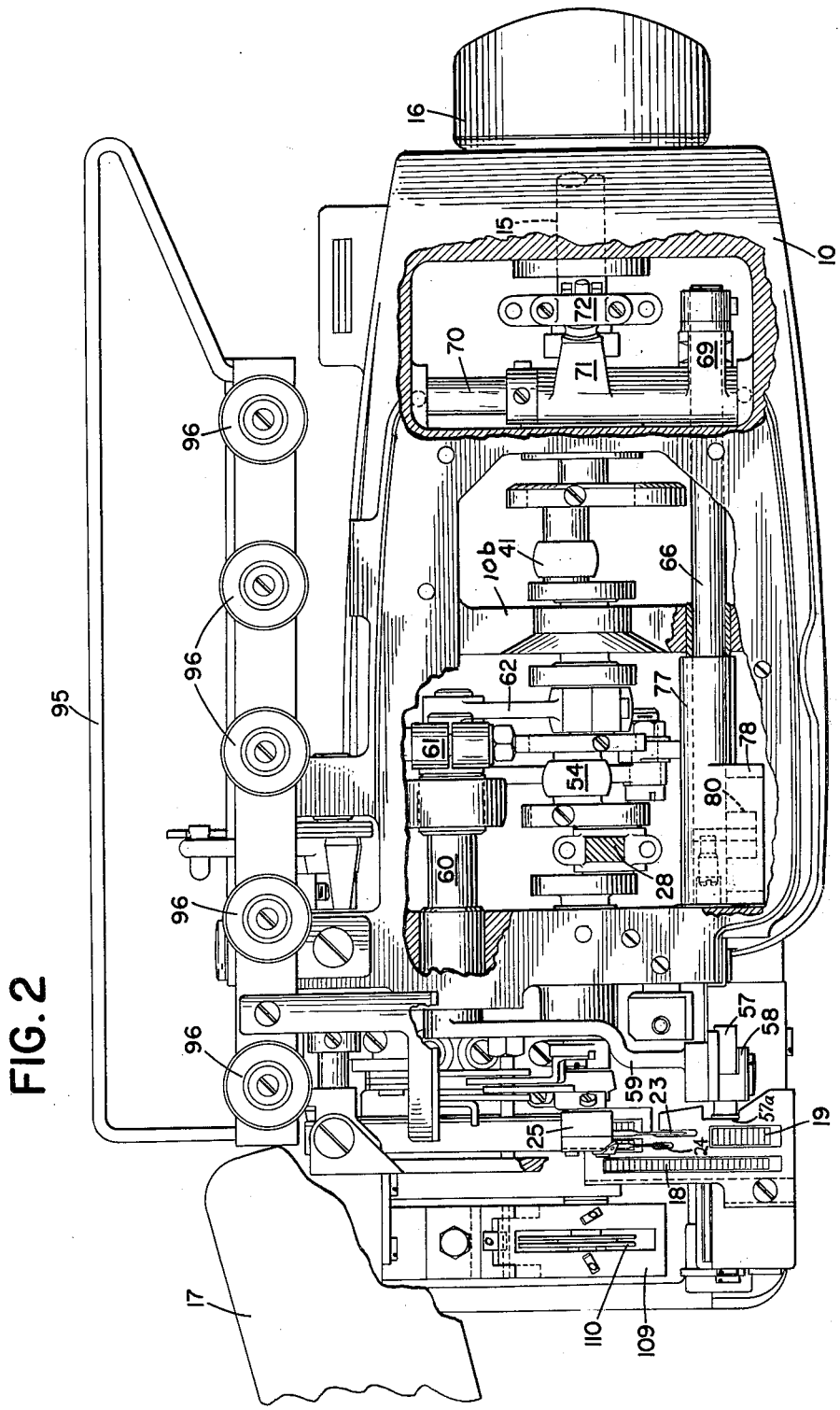
FIG. 2 is a plan view of the machine, with a cover member removed and with certain parts shown in section and other parts broken away for clarity of illustration.
Figure 3:
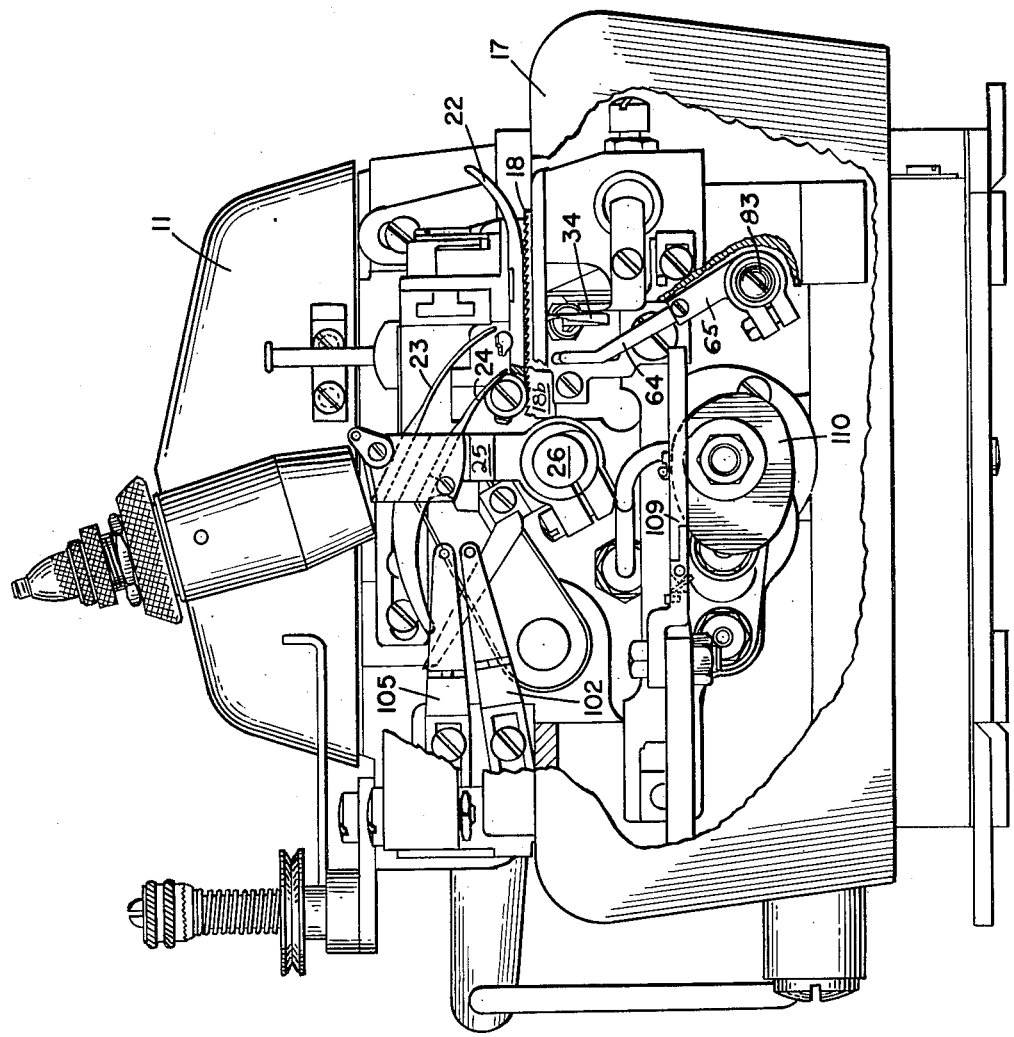
FIG. 3 is an end elevational view of the machine with a work supporting member broken away in part.

The illustrative machine is provided with work feeding mechanism which may suitably be of the character disclosed in said Wallenberg et al. patent. It comprises a main feed dog 18 and a differential feed dog 19 (FIGS. 2 and 10) these being carried respectively by feed bars 18a and 19a (FIG. 1). Connected with the main feed bar is a chain feed dog 18b (FIGS. 3 and 10). The feed bars are reciprocated longitudinally by means of pitmans 20 and 21 having strap portions surrounding eccentrics carried by the main drive shaft 15 adjacent its left end. The feed bars 18a and 19a are arranged to ride upon another eccentric on the shaft 15 adapted to impart lifting and lowering movements to the forward ends of the feed bars. Cooperating with the feed dogs 18, 18b and 19 is a presser foot 22 which may be mounted in the manner disclosed in said Wallenberg et al. patent.

Figure 8:
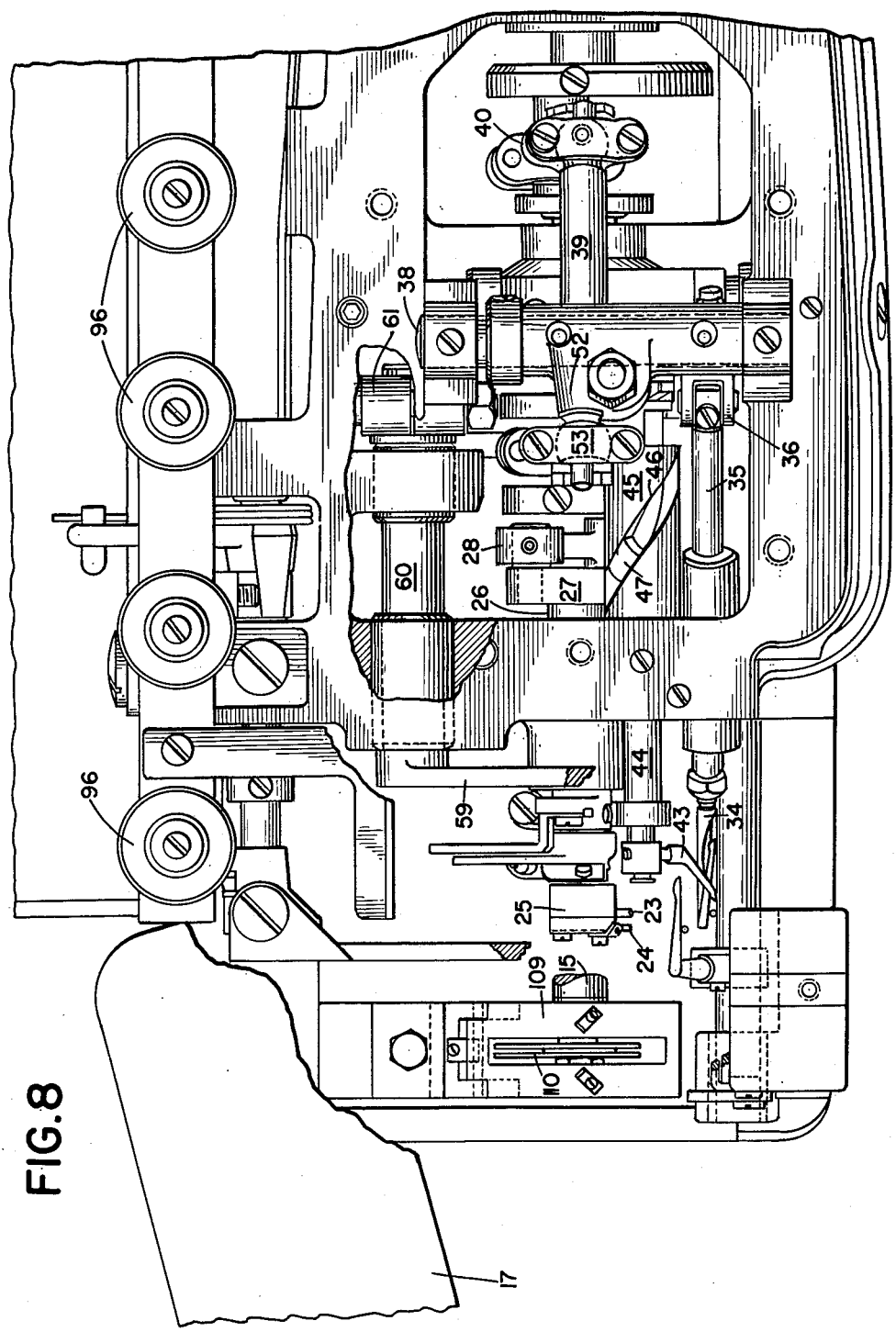
FIG. 8 is a plan view of the left-hand portion of the machine, with a cover member removed and certain parts broken away.

The stitch forming devices include a pair of curved needles 23 and 24 (FIGS. 1, 2 and 3) carried by a rockable member or arm 25 secured to a rock shaft 26 (FIGS. 3 and 8) extending through the left end wall of the enclosed housing. Within the housing the shaft 26 has secured thereto an arm 27 (FIGS. 1 and 12) the outer end of which is pivotally connected with the upper end of a pitman 28. The lower end of this pitman cooperates with a crank portion 29 of the main drive shaft 15. At the lower end of pitman 28 there is provided a finger 30 adapted to dip into the lubricant within the chamber 13 and create a spray or mist for the lubrication of various parts within the enclosed housing.

Figure 13:
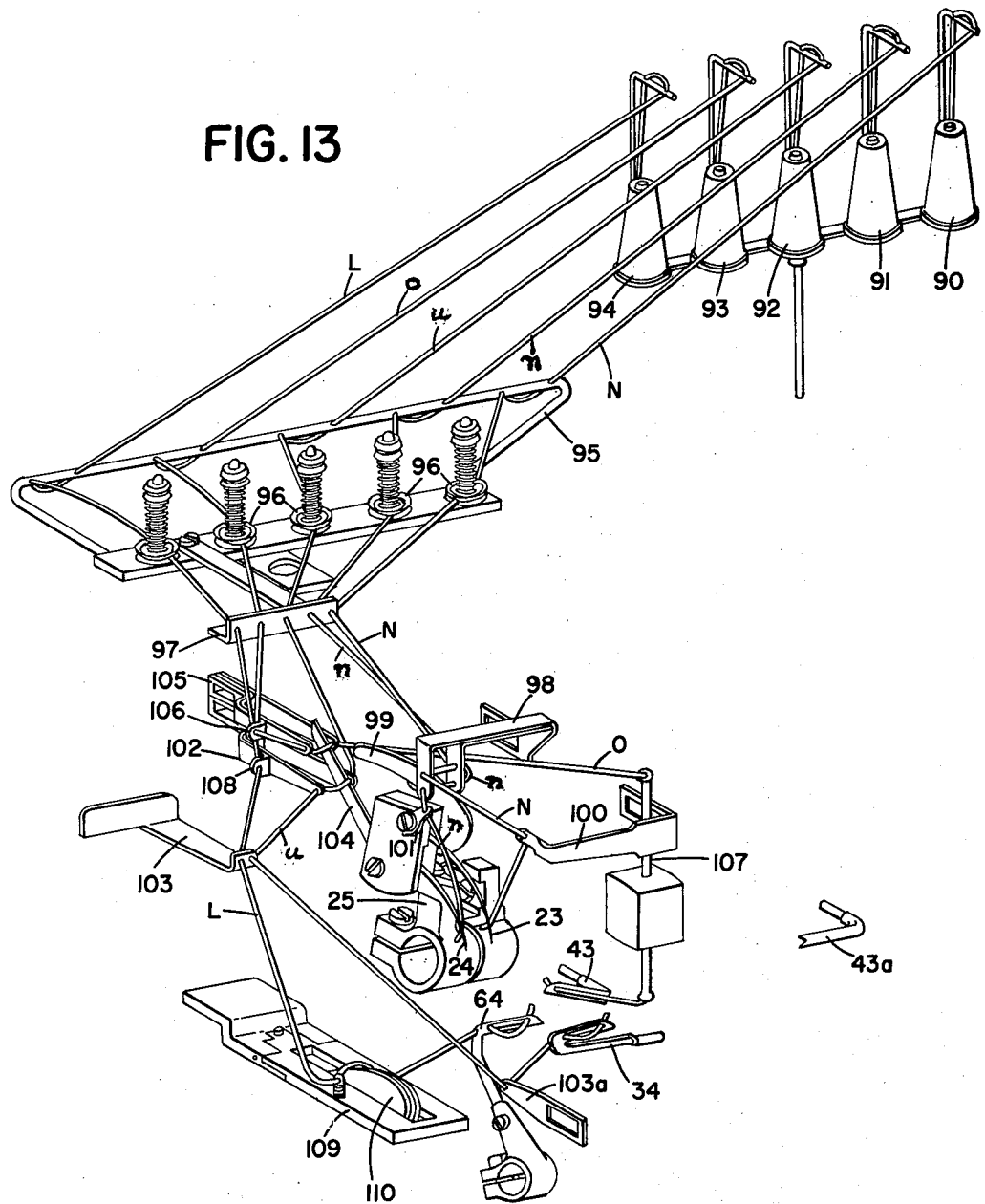
FIG. 13 is a perspective view showing the thread supply and the thread guides and take up means embodied in the machine.

As the needle carrying arm 25 is rocked through the connections described, the thread carrying ends of the two needles will be passed downwardly through openings 31 and 32 in a throat plate 33 (FIG. 10). Cooperating with the needle 23 to form overedge stitches around the edge of the work being fed along the throat plate 33 is a thread carrying looper 34 (FIG. 1) which is mounted for longitudinal reciprocation along a line inclined to the horizontal and in a vertical plane perpendicular to the direction of feed. This looper is carried by a rod 35 mounted for reciprocation in a bearing sleeve in the left end wall of the housing. At its inner end the rod 35 is connected by a link 36 with the upper end of an arm 37 mounted for rocking movement about a rod or shaft 38. Connected with the arm 37 and extending to the right therefrom is an arm 39 carrying a ball pin at its outer end which cooperates with a pitman 40 the lower end of which cooperates with a spherical crank portion 41 of the shaft 15. To the lower end of pitman 40 is secured a finger 42 arranged to dip into the lubricant in the chamber 13 and to disperse the same therein. Looper 34 passes through the loop of thread carried by the needle 23 and presents its own loop at the right side of the work substantially at the level of the work supporting surface of member 17. Here either a thread carrying looper 43 or a spreader 43a is arranged to cooperate with looper 34. If the member 43 is a thread carrying looper, as shown in FIGS. 1 and 13, it serves to pass its thread through the loop of thread carried by looper 34 and presents its own loop in the path of the needle 23 above the work supporting surface at the time this needle is again rocked downwardly. If the overedge stitch forming member is a spreader, as indicated at 43a in FIG. 13, it will carry the loop of thread from looper 34 and carry this into the path of the needle 23. To impart the desired motion to the looper 43, or spreader 43a, the latter is carried by a rod 44 arranged for longitudinal reciprocation and also for oscillation about its axis. This rod is journaled in a sleeve 45 (FIGS 1 and 8) having a helical slot 46 extending through the same. Rod 44 carries a helical key 47 arranged to ride in the slot 46 so that as the rod 44 is reciprocated longitudinally it will also be oscillated about its axis. For reciprocating the rod 44 the latter is provided with spaced washers 48 between which are fitted forked cylindrical end portions 49 (FIG. 1) of an arm 50 mounted for rocking movement about a rod or shaft 51. Connected with the arm 50 is an arm 52 which extends toward the left and carries at its outer end a ball pin cooperating with a spherical strap at the upper end of a pitman 53. At its lower end this pitman cooperates with a spherical crank portion 54 of the drive shaft 15. It will thus be seen that upon rotation of the shaft 15 the rod 44 will be shifted longitudinally, and by virtue of the key and slot arrangement described it will also be oscillated. Pitman 53 at its lower end is provided with a finger 55 arranged to dip into the lubricant supply in the chamber 13 and assist in dispersing the latter in the form of a mist.

Suitable edge trimming mechanism is provided for trimming the free edges of superposed layers of work as they advance toward the stitching point in order to insure uniformity of the overedge stitching in relation to such edges. This trimming mechanism is arranged to operate upon the work in the region designated 56 in FIG. 10. A stationary blade 57a (FIG. 2) is provided below the throat plate and extends upwardly to the top surface of the latter. Cooperating with this stationary blade is a movable blade 57 adjustably secured in a head 58 carried by a rock arm 59 (FIG. 2). This rock arm is secured to a shaft 60 suitably journaled for rocking movement in the left end wall of the enclosed housing. At its inner end the shaft has secured thereto an arm 61 (see also FIG. 11) to the lower end of which is pivotally connected a pitman 62 the opposite end of which cooperates with a crank portion 63 of the shaft 15. Upon turning of this drive shaft the arm 61 and shaft 60 will be rocked back and forth thus causing the movable trimmer blade carrying arm to be rocked downwardly and upwardly.

Cooperating with the needle 24 when the latter is passed downwardly through the throat plate is a four-motion looper 64 (FIG. 4). This looper is carried by an arm 65 secured to a looper rod 66 which is mounted for longitudinal sliding movement and limited oscillatory movement in suitable bearings provided in the main frame. Adjacent its right end the rod 66 is provided with spaced washers 67 which are suitably retained on the rod as by a collar 67a (FIG. 9) and which cooperate with cylindrical formations 68 at the lower end of a forked arm 69. The cylindrical portions 68 are disposed at opposite sides of the rod 66. Arm 69 is carried by a rod or shaft 70 and has integrally connected with it, by means of a sleeve or the like, an arm 71 which extends toward the right. (See also FIGS. 1 and 2.) A ball pin mounted in the outer end of arm 71 cooperates with a spherical strap at the upper end of a pitman 72. Adjacent its lower end this pitman has a spherical strap cooperating with a spherical eccentric 73 (see also FIG. 9) carried by the main drive shaft 15. It will be apparent that upon the rotation of shaft 15 the rod 66 will be shifted back and forth in an axial direction and will thereby impart loop seizing and shedding movements to the looper 64. A downwardly extending finger 74 carried by the pitman 72 is arranged to dip into the lubricant within the chamber 14 and disperse a mist for the lubrication of the parts within this chamber.

Needle avoid movements are imparted to the looper 64 by connections from the trimmer blade operating mechanism described above. For this purpose there is mounted on the rod 66 between bearings 75 and 76 (FIG. 4) a rock member 77. This, as best shown in FIG. 5, has a lateral extension 78 which provides a guide channel 79 in which rides a block 80. The latter has a stem 81 fitted within a transverse opening through the rod 66 and clamped therein by means of a small block 82. The left end of the rod 66 is hollow, as indicated at 66a, and thus provides access to a set screw 83 having screw threaded engagement with the rod 66 to permit tight clamping of the block 82 against the stem 81. It will be understood that the arrangement is such that the rod 66 is free to slide axially within the member 77 but will turn with the latter. Turning of sleeve member 77 is brought about through a downwardly extending arm 84 integral therewith having its lower end pivotally connected with a link 85 (FIG. 11). The opposite end of this link is connected by a screw stud 86 with the arm 61 through which the movable trimmer blade carrying arm is rocked. Thus, as the trimmer blade is operated, the looper rod 66 will be oscillated to a limited extent so as to provide a needle avoid movement of the looper 64. The timing of the operation of the trimmer is made such as to coincide with the desired needle avoid movement of the looper 64. The extent of such needle avoid movement may be varied, within limits, to suit particular circumstances, such as the diameter of needle 24, and the like, by varying the connection between the arm 84 and link 85. For this purpose arm 84 is provided with an elongated opening 88 with which cooperates a bolt 87 providing the pivotal connection between the arm and link.

It will be seen from the foregoing that the machine constructed in accordance with the invention is adapted to produce an overedge line of stitching around the free edge of the layers of the work advanced past the stitching point and to provide, in addition, lines of through and through stitches of the 401 type inwardly a suitable distance from the free edge of the work. The overedge stitch may either be a two-thread or a three-thread stitch, depending upon whether the stitch forming member 43 is in the form of a thread carrying overedge looper or is in the form of a spreader, as shown at 43a in FIG. 13. When the later is used it serves to pick up the thread from the underlooper 34 and to carry this upwardly and across the top of the work into the path of the needle 23.

Any suitable spacing of the needles 23 and 24 may be provided, depending upon the work to be performed. They are spaced rearwardly in relation to each other, as they pass through the throat plate, a distance of a few stitch lengths in order to provide clearance between them for the movement of the other stitch forming devices described. They are spaced laterally of the line of stitch formation to conform with the desired relative locations of the two lines of stitching. In a typical example the needle 23 is arranged to enter the fabric at 1/8 of an inch from the trimmed edge, while the needle 24 is arranged to pass through the fabric at a point 5/64 of an inch inwardly of the line along which the needle 23 enters the fabric. This is known as a 5 gauge—1/8 machine. In another typical example the needle 23 may enter the fabric along a line 3/16 of an inch inwardly of the free edge and the needle 24 may enter the fabric 12/64 of an inch inwardly of the line along which the needle 23 enters the fabric. A machine so constructed would be known as a 12 gauge—3/16 machine.

Improved means are provided for guiding and otherwise handling the various threads supplied to the needles and loopers employed in the machine. Assuming that the machine is adapted to produce a three-thread overedge stitch there will be five threads altogether supplied from cones 90, 91, 92, 93 and 94 (FIG. 13). These threads have been designated N, n, u, o and L to indicate, respectively, the threads supplied to the overedge curved needle 23, the needle 24, the underlooper 34, the overedge looper 43 and the looper 64. All of the threads extend from their cones through guide openings in a rod extending across the top of each one of them to and through suitable guide openings in a bar 95. From here each thread passes between the discs of a thread tensioning device 96 and then to a fixed guide member 97 carried by the frame of the machine. From the latter, thread N is passed through aligned openings in downwardly extending arms of a bracket 98 adjustably secured to the frame of the machine. A cam-shaped arm 99 secured to the needle carrying rock member 25 engages the thread between the downwardly extending arms of bracket 98 to impart a pull off and take up action to the thread N. From bracket 98 thread N is passed through an eye in an adjustable guide 100 carried by the frame of the machine and from here down to the needle 23.

Thread n passes from guide 97 through another pair of aligned openings in the downwardly extending arms of bracket 98, then through an eyelet 101 mounted on the needle carrying rock member 25 down to the needle 24. Cam arm 99, assisted by eyelet 101, imparts the desired pull off and take up actions to thread n. Thread u passes from guide 97 through aligned openings in opposed arms of a bracket 102 adjustably secured to the frame of the machine. From here thread u passes through an opening in a fixed guide 103, then down to an adjustable guide 103a, in more or less direct alignment with underlooper 34 to which the thread is then led. A rearwardly and upwardly extending arm 104 carried by the rock member 25 serves to impart a pull off and take up action to the thread u at the appropriate time in the stitch forming cycle. Thread o passes from guide 97 through an eyelet in a laterally extending arm 106 of a bracket 105 adjustably mounted on the frame of the machine. Bracket 105 is positioned above the bracket 102 and has two spaced arms straddling the arm 104 and through which the thread o is passed from the eyelet in arm 106. From here the thread o is passed forwardly and then downwardly through a guide tube 107 to a point adjacent the overedge looper 43 to which it is led. It will be seen that arm 104 serves to impart a pull off and take up action to the thread o in a manner similar to its action applied to thread u. Looper thread L passes from guide 97 through an eye in a laterally extending arm 108 of bracket 102. From here it passes through an eye in bracket 103 and then down to laterally spaced eyelets carried by a plate 109 beneath the work supporting surface of the machine. Plate 109 has an elongated opening through it between the spaced eyelets mentioned, and through this opening extends a cam 110 secured to the main drive shaft 15. This cam serves to impart the desired pull off and take up action to the thread L.

Through the coaction of the various devices described above it will be apparent that superposed layers of work may have their edges trimmed and then provided with an overedge line of stitching and a through and through line of stitching spaced inwardly a suitable distance from the overedge stitching to provide a strong seam. The particular combination of means provided for this purpose is compact and capable of exceptionally high speed operation. The provision of separate connections from the drive shaft for reciprocating the underlooper 34 and the looper rod 66 enables each of these members to be driven only the necessary amount for proper seam formation. It has been found that the extent of reciprocation required for the looper 64 is less than that required for looper 34. Thus, in a typical machine embodying the invention, the looper 34 has been given a stroke of 1 inch whereas the looper 64, and hence its rod 66, has required only a 7/8 inch stroke.

While a preferred embodiment of the invention has been disclosed in some detail, it will be understood that various modifications of certain of the mechanisms disclosed may be employed within the scope of the invention defined by the appended claims.

I claim:

1. In a sewing machine adapted to produce a safety stitch and having a frame with a low lubricant retaining main housing, a work supporting extension projecting from said housing at one end thereof and providing a work supporting surface at its top, a main rotary drive shaft extending longitudinally of said housing and having one end within said extension beneath said work supporting surface, the opposite end of said shaft extending outwardly of said housing and carrying a handwheel and pulley for turning the same, stitch forming devices including a rockable member extending through a wall of said housing and having an arm carrying a plurality of curved needles, complementary stitch forming devices cooperating with one of said needles to form a line of overedge stitches, a looper rod parallel with said drive shaft disposed mainly within said housing but extending outwardly therefrom beneath said work supporting surface and having rigidly connected therewith a four motion looper arranged to cooperate with another of said needles to form a line of through and through two-thread chain stitches spaced from said overedge line of stitches, oscillatable means within said housing cooperating with said looper rod to oscillate the latter about its axis, said rod being reciprocable longitudinally relative to said oscillatable means to impart loop seizing and shedding movements to said looper and being oscillatable about its axis by said oscillatable means to impart needle avoid movements to said looper, and connections from said drive shaft within said housing for rocking said rockable member, for operating said complementary stitch forming devices, for imparting said longitudinal movements to said looper rod and for oscillating said oscillatable means and said rod, all in coordinated relation to form said lines of stitches.

2. In a sewing machine of the character set forth in claim 1, means for trimming the edge of work to be stitched in advance of the point of stitch formation, said means comprising a rockable arm, and partially common connections from said drive shaft to said arm for rocking the latter and to said oscillatable means for oscillating the same.

3. In a sewing machine of the character set forth in claim 1, said complementary stitch forming devices comprising a reciprocatory thread carrying member and a cooperating reciprocatory and oscillatory member, said members and said looper rod being all mounted for reciprocation in parallel vertical planes.

4. In a sewing machine of the character set forth in claim 1, means for supplying and guiding threads to the several thread carrying stitch forming devices, said means directing all but one of said threads along a path in the region of said rockable member, means carried by said rockable member for engaging said all but one of said threads to impart a take-up action thereto, and cam means on said drive shaft arranged to impart a take-up action to said one thread.

5. In a sewing machine of the character set forth in claim 1, means for supplying and guiding a thread to each of said stitch forming devices, said means directing thread to said needles and to said complementary stitch forming devices along paths in the region of said rockable member, and means carried by said rockable member for engaging said threads to impart a take-up action thereto.

6. In a sewing machine of the character set forth in claim 5, said rockable member having a plurality of arms connected therewith, one of said arms being arranged to engage and provide a take-up action to the threads extending to said needles and the other of said arms being arranged to engage and impart a take-up action to the threads extending to said complementary stitch forming devices.

7. In a sewing machine of the character set forth in claim 1, said connections from said drive shaft for operating said rockable member and said complementary stitch forming devices being provided in one portion of said housing, and the connections from said drive shaft for reciprocating said looper rod being provided in another portion of said housing which is further to the right of said work supporting extension than said one portion of said housing.

8. In a sewing machine of the character set forth in claim 2, said connections from said drive shaft for operating said rockable member, said rockable arm and said complementary stitch forming devices being provided in one portion of said housing, and the connections from said drive shaft for reciprocating said looper rod being provided in another portion of said housing which is further to the right of said work supporting extension than said one portion of said housing.

9. In a sewing machine adapted to produce a safety stitch and having a frame with a relatively low lubricant retaining main housing, a work supporting extension projecting from said housing at one end thereof and providing a work supporting surface at its top, a main rotary drive shaft extending longitudinally of said extension and beneath the work supporting surface thereof, stitch forming devices including a rockable member extending through a wall of said housing and carrying a curved needle with a thread carrying eye adapted to be moved from a position above said surface to a point below the same, a reciprocatory thread carrying looper, a rod having said looper secured thereto extending through a wall of said housing and arranged for reciprocation transverse to the direction of seam formation to cause said looper to cooperate with said needle beneath said work support and carry its own thread to a point at one side of the line of seam formation, a cooperating stitch forming member extending through said last-mentioned wall of said housing and arranged to cooperate with a loop of thread carried by said looper adjacent said point and to present a loop of thread in the path of said needle, connections within said housing from said drive shaft for operating said rockable member, said looper and said cooperating member in coordination to produce an overedge stitch, an extra curved needle carried by said rockable member, a four motion looper cooperating with said extra needle, and connections within said housing from said drive shaft wholly independent of said first-mentioned connections for imparting four motion movements to said four motion looper to form a two-thread chain stitch in conjunction with said extra needle.

10. In a sewing machine of the character set forth in claim 9, said connections from said drive shaft for operating said first-mentioned looper, said cooperating stitch forming member and said four motion looper being disposed at one side of the line of seam formation within said lubricant retaining housing.

11. In a sewing machine of the character set forth in claim 10, said first-mentioned looper, said cooperating stitch forming member and said four motion looper being reciprocated along axes disposed in parallel vertical planes.

12. In a sewing machine of the character set forth in claim 11, said first-mentioned looper being reciprocated to a greater extent than said four motion looper in a direction normal to the line of seam formation.

References Cited in the file of this patent

UNITED STATES PATENTS

| | | |
|---|---|---|
| 1,528,499 | Moffatt | Mar. 3, 1925 |
| 1,587,957 | Huber | June 8, 1926 |
| 1,949,073 | Gruman et al. | Feb. 27, 1934 |
| 2,157,373 | Weis | May 9, 1939 |
| 2,704,042 | Wallenberg et al. | Mar. 15, 1955 |
| 2,730,060 | Schoij et al. | Jan. 10, 1956 |
| 2,834,309 | Russell et al. | May 13, 1958 |

FOREIGN PATENTS

| | | |
|---|---|---|
| 1,116,226 | France | Jan. 30, 1956 |